Patented Oct. 21, 1952

2,615,012

UNITED STATES PATENT OFFICE 2,615,012

PREPARATION OF VINYL ESTERS OF A STABILIZED ROSIN ACID

John C. Robinson, Jr., Wilmington, Del., assignor to Hercules Powder Company, Wilmington, Del., a corporation of Delaware No Drawing. Application February 18, 1950, Serial No. 145,080

7 Claims. (Cl. 260—100)

This invention relates to a process for the manufacture of vinyl esters of carboxylic acids. More particularly, it relates to a process for the manufacture of vinyl esters of rosin acids.

Various procedures are known for the production of vinyl esters of carboxylic acids generally. One of these procedures involves the acidolysis of vinyl acetate using a desired carboxylic acid having at least 3 carbon atoms in the presence of a mercury catalyst. Another procedure, and one to which this invention particularly relates, is that which involves the reaction of acetylene with the desired acid in the presence of a carboxylic acid salt of zinc or cadmium. This method is that described in U. S. Patent No. 2,066,075.

It is stated in said U. S. Patent No. 2,066,075 that rosin or abietic acid may be reacted with acetylene in the presence of a carboxylic acid salt of zinc or cadmium as catalyst and under the conditions there described as generally applicable to all carboxylic acids of 5 carbon atoms or higher to yield the vinyl ester of rosin or abietic acid. This statement, however, is subject to considerable qualification or limitation. While it is true that the vinyl ester of rosin or abietic acid can be prepared by the procedure of U. S. Patent No. 2,066,075, the crude ester product obtained directly from the acetylene treatment cannot be distilled either at atmospheric or reduced pressure to isolate the desired vinyl ester of rosin or abietic acid. Any attempt to do so results in the entire mass setting up solid in the distillation pot with no actual distillation taking place. It is possible to achieve a distillable mass by subjecting the crude ester product to a series of extractions involving extractions with aqueous mineral acid followed by extractions with aqueous alkali. Such operation is, however, exceedingly cumbersome for use in practical commercial operations. Furthermore, use of the extraction technique cuts down on the yield substantially as will be apparent from what follows.

I have recently found that for some unexplained reason it is only necessary to give the rosin a preliminary treatment which will have the effect of chemically stabilizing it in order to avoid the above-mentioned extraction steps and make possible the direct distillation of the crude ester product to yield the desired vinyl ester of the chemically stabilized rosin. By a chemical stabilization treatment, there is meant either hydrogenation of the rosin to provide a hydrogenated rosin or dehydrogenation of the rosin to provide a dehydrogenated rosin. It is well known to the art that either the hydrogenation or the dehydrogenation of a rosin has a stabilizing effect thereon in the sense that the products of such treatments are much more stable to air oxidation than are the rosins from which they are derived. The reason, however, for the stabilization treatments having the effect which provides the basis for this invention is quite obscure.

Broadly expressed, this invention comprises a process for preparing a vinyl ester of a rosin acid which in turn comprises subjecting a rosin acid to a chemical stabilization treatment which may be either a hydrogenation treatment or a dehydrogenation treatment, contacting the resulting chemically stabilized rosin acid in liquid phase with acetylene in the presence of a carboxylic acid salt of zinc, mercury or cadmium as catalyst, and separating the resulting vinyl ester of the chemically stabilized rosin acid from the other ingredients of the reaction mixture by distillation. The other ingredients of the reaction mixture will comprise unreacted stabilized rosin acid, catalyst, acetylene polymers, polymers of the vinyl ester of stabilized rosin acid, possibly complexes of the catalyst with the aforementioned ingredients, etc. The distillation is preferably carried out in vacuo to avoid excessive polymerization.

Any carboxylic acid salt of zinc, mercury or cadmium may be employed in carrying out the invention. Examples of such salts are zinc acetate, zinc stearate, zinc benzoate, cadmium benzoate, the zinc, mercuric and cadmium salts of hydrogenated rosin acid, the zinc, mercuric and cadmium salts of dehydrogenated rosin acid, mercuric acetate, mercuric phosphate, etc. The salts may be added as such to the stabilized rosin acid to be treated with acetylene or they may be prepared by dissolving the oxides of zinc, mercury or cadmium in the particular stabilized rosin acid to be employed. Generally speaking, the zinc salts are preferred in view of the fact that the reaction proceeds with greater rapidity with such catalysts. When mercury salts are employed, they are preferably employed in the mercuric form. In general, somewhat lower reaction temperatures may be effectively employed when mercury salts are used as catalysts as compared with operations using zinc or cadmium catalysts.

Having described the invention in its broadest aspects, the following examples are given as illustrative embodiments thereof. They should not be considered as limiting the invention, however, but merely as specific embodiments of the broad concept. All parts and percentages in this specification and claims are by weight unless otherwise indicated. The pressures mentioned in the examples (microns Hg and mm. Hg) have reference to absolute pressure.

Example 1

A dehydrogenated rosin was prepared by heating N wood rosin with a platinum catalyst in the absence of added substances capable of reducing the unsaturation thereof. The resulting product had a dehydroabietic acid content of about 45% and an abietic-type resin acid content of 0%.

To 100 g. of the above dehydrogenated rosin in a flask were added 4.5 g. of anhydrous zinc acetate. The mixture was heated to 200° C. while being sparged with nitrogen. After the acetic acid had been purged out of the mixture, about 55 cc. of the product were placed in a 110 cc. stainless steel, rocking-type autoclave. The autoclave was flushed with nitrogen. Thereafter, additional nitrogen was forced in to provide a pressure of 40 p. s. i. (gage). When the autoclave had reached a temperature of 230° C., acetylene was admitted at tank pressure, 250–300 p. s. i. (gage). When the pressure had dropped about 100 p. s. i., it was raised back to top tank pressure and the procedure repeated as long as gas was being absorbed. When the rate of gas absorption had nearly stopped (about 4 hours after starting the introduction of acetylene) the gas was bled off once and replaced with fresh acetylene and the run continued. The overall period of elapsed time from the start of the introduction of acetylene to the final bleeding off of acetylene was about 7 hours. The autoclave was then cooled and the crude product removed. The crude product was filtered to remove a small amount of catalyst which had precipitated. This crude product was then distilled directly to provide a relatively pure vinyl ester of dehydrogenated rosin boiling at from 160° C. to 190° C. at 0.5 to 1.0 mm. Hg (absolute). This distilled product was a pale yellow-colored liquid having an acid number of 0. It was obtained in the amount of 75 g. which amounted to a yield of 70% based on the dehydrogenated rosin used as starting material.

Example 2

A hydrogenated rosin was prepared by subjecting N wood rosin to hydrogen in the presence of a Raney nickel catalyst. The resulting product was one which was about 45% saturated with hydrogen and which had an abietic acid content of about 5% as determined by ultraviolet absorption analysis. Abietic acid was the only abietic-type resin acid present in a significant amount.

The apparatus employed was the same rocking-type autoclave as that used in Example 1. The starting materials and the amounts thereof were the same as those employed in Example 1 with the exception that the dehydrogenated rosin was replaced with hydrogenated rosin. The conditions of the experiment were the same as those employed in Example 1. The period of time which elapsed from the start of the introduction of acetylene to the first point at which acetylene absorption had nearly stopped was about 4 hours. The overall period during which acetylene was introduced into the autoclave was about 6 hours. The crude product obtained was distilled to provide a relatively pure vinyl ester of hydrogenated rosin boiling at from 180° C. to 210° C. at 1 mm. Hg (absolute). The distilled product was a pale yellow-colored liquid having an acid number of 0. It was obtained in the amount of 77 g. which amounted to a yield of 71% based on the hydrogenated rosin used as starting material.

Example 3

The same type of dehydrogenated rosin was used in this experiment as was used in Example 1.

The autoclave used in this experiment was different from that of the preceding two experiments. It was a much larger autoclave in which 600 g. batches could be conveniently handled. The autoclave, designed to take care of dangerous exothermic reactions, had an in-built wide rupture disc and an internal cooling coil. It was of the rocking type.

Five hundred grams of the dehydrogenated rosin, 100 cc. of toluene, and 44 g. of anhydrous zinc acetate were charged into the autoclave and the mixture heated to 210–220° C. After heating the mixture at this temperature for 10–15 minutes, the vent line of the autoclave was opened whereupon acetic acid and a little toluene were allowed to escape. Acetylene was then introduced into the autoclave at tank pressure, 250–300 p. s. i. (gage). Since traces of acetic acid were left in the rosin-catalyst-solvent mixture, the initial reaction appeared to result in the formation of vinyl acetate. This compound, a relatively high vapor pressure liquid, reduced the partial pressure of the acetylene in the autoclave such that despite a total pressure of 250 p. s. i. (gage) from the acetylene reservoir the reaction rate was appreciably diminished. Hence, the acetylene-vinyl acetate vapor was bled out of the autoclave after 10–15 minutes of operation and the autoclave repressured with acetylene. The reaction was continued until the reaction had substantially stopped as evidenced by the acetylene pressure. The total period of introduction of acetylene amounted to about 6 hours.

The crude product so obtained was distilled to give a relatively pure vinyl ester of dehydrogenated rosin boiling at 160° C. to 190° C. at 1 mm. Hg (absolute). In this manner 339 g. of distilled vinyl ester of dehydrogenated rosin were obtained. This corresponded to a yield of 87% based on the dehydrogenated rosin used as starting material. The distilled product was a pale yellow-colored liquid having an acid number of 0.

Example 4

The same hydrogenated rosin was employed as that used in Example 2. However, the equipment employed was that used in connection with Example 3. The starting materials and the amounts thereof were the same as in Example 3 with the exceptions (1) that the dehydrogenated rosin was replaced with hydrogenated rosin and (2) 0.5 g. of p-tertiarybutyl catechol was added as a polymerization inhibitor. The conditions of the reaction were essentially the same as those of Example 3. The crude product resulting was distilled to provide a relatively pure vinyl ester of hydrogenated rosin which boiled at from 160° C. to 190° C. at 1 mm. Hg (absolute). This distilled product was obtained in the amount of 270 g. which corresponded with a yield of 73% based on the hydrogenated rosin employed as starting material. It was a pale yellow-colored liquid having an acid number of 0.

Example 5

A hydrogenated rosin was preparing by subjecting N wood rosin to hydrogen in the presence of a palladium-on-charcoal catalyst. The resulting product was one which was 98% saturated with hydrogen and which had an abietic-type resin acid content of 0.

The equipment employed was that utilized in Example 3. The starting materials and the amounts thereof were the same as those in Example 3 with the exceptions (1) that the dehydrogenated rosin was replaced with hydrogenated rosin, (2) that 430 g. of hydrogenated rosin were used, and (3) that 35 g. of catalyst were used. The crude product obtained in this manner was distilled to yield a relatively pure vinyl ester of hydrogenated rosin boiling between 160° C. and 190° C. at 1 mm. Hg (absolute). The distilled product was obtained in the amount of 216 g. which corresponded with a yield of 64% based on the hydrogenated rosin used as starting material. The distilled product was a pale yellow-colored liquid having an acid number of 0.

*Example 6*

Example 3 was repeated using N wood rosin in place of the dehydrogenated rosin. The crude ester product upon attempted distillation in vacuo set up solid in the flask and could not be distilled even at 0.5 mm. Hg (absolute).

In describing the invention in its broad aspects heretofore, the term "rosin acid" has been employed. Thus, the monomers of the invention are defined as "vinyl esters of a hydrogenated rosin acid" and "vinyl esters of a dehydrogenated rosin acid." The term "rosin acid" is here used in a generic sense to include both commercial rosins, which are known to contain a neutral body fraction as well as a rosin acid fraction, and the rosin acid fractions obtained therefrom. Thus, there is included wood rosin, gum rosin, and the substantially entirely acidic fractions obtained therefrom as by distillation, combination saponification and extraction processes, etc. It is well known, too, that the acidic fraction contained in wood or gum rosin is a mixture of isomeric resin acids which include abietic, levopimaric, dextropimaric, neoabietic, isodextropimaric, etc. acids. Such specific compounds are equivalent to the naturally occurring mixtures found in wood or gum rosin for present purposes and the term "rosin acid" is intended to be inclusive thereof; however, from an economic standpoint, the naturally occurring wood or gum rosin or acidic fractions thereof are preferred.

Tall oil is well known to contain resin acids, fatty acids and a variety of nonacidic constituents. The resin acid fraction derived from tall oil is the equivalent of wood or gum rosin for many purposes, and for the purpose of this invention that equivalency exists. Accordingly, for present purposes the resin acid fraction of tall oil is to be considered as a "rosin acid."

The hydrogenated rosin acids employed in accordance with this invention may be made by any of the known procedures for hydrogenating rosin acids. As examples thereof, there may be mentioned the procedures of U. S. 2,094,117 and U. S. 2,155,036. Other procedures which are of interest are those described in U. S. 2,174,651; U. S. 1,973,-865; U. S. 2,113,808; and U. S. 2,346,793.

Rosin acids of various degrees of hydrogenation may be used in preparing vinyl esters in accordance with this invention. In general, any of the prior art hydrogenated rosin acids may be employed. It is preferred, however, to employ a hydrogenated rosin acid which is at least 40% saturated with hydrogen and which has a content of abietic-type resin acids of not over 10%. It is most preferred to employ a hydrogenated rosin acid having a content of abietic-type resin acids of substantially 0.

"Per cent saturation with hydrogen" as applied to any particular sample of hydrogenated rosin acid means $$\frac{100\% \times \text{No. of g. of } H_2 \text{ absorbed per 100 g. of the initial rosin acid in preparing the sample}}{\text{No. of g. of } H_2 \text{ absorbed per 100 g. of the initial rosin acid in preparing a completely saturated rosin acid}}$$

A "completely saturated rosin acid" is one prepared under such strenuous conditions of hydrogenation that substantially all of the ethylenic double bonds contained in the starting rosin acid are saturated with hydrogen. The analytical procedure used to effect complete saturation of a rosin acid is described in detail infra.

As stated above, it is preferred that the hydrogenated rosin acid employed have a content of abietic-type resin acids of not over 10%, and most preferred that the content of abietic-type resin acids be substantially 0. By "abietic-type resin acids" there is meant the class of resin acids having the carbon skeleton of abietic acid, i. e.

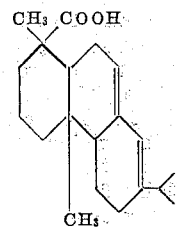

and having two ethylenic double bonds per molecule. Resin acids falling in this class are abietic acid, levopimaric acid, and neoabietic acid. This class of resin acids is sometimes described in the literature as acids of the levopimaric acid-abietic acid structural group.

The dehydrogenated rosin acids used in accordance with this invention may be prepared according to known procedures. As exemplary of known procedures of dehydrogenating rosin acids there is mentioned the heating of rosin acid for one to two hours at 150° C. to 200° C. with a dehydrogenation catalyst such as iodine or sulfur, in the amount of 0.5 to 4% of the rosin acid. Dehydrogenated rosin acids may also be produced by what is known in the art as the "disproportionation" reaction. A disproportionated rosin acid is a rosin acid that has been treated with an active hydrogenation catalyst under conditions of reaction adapted to produce an intra- and intermolecular rearrangement of the hydrogen atoms in the rosin acids contained therein and in the absence of added substances capable of reducing the unsaturation of the rosin acid under the conditions of treatment. Such disproportionated rosin acids have a substantial proportion of dehydrogenated acidic constituents and are properly regarded as dehydrogenated rosin acids. See in this connection U. S. 2,154,629 to Littmann. Other materials which are properly classed as dehydrogenated rosin acids and which can be used as such in accordance with this invention are pyroabietic acid which is rich in dehydroabietic acid, etc. It may be prepared by heating a rosin acid for one to four hours at 260-315° C. The pseudopimaric acid which is described in U. S. 2,072,628 is similarly suitable.

The above-described procedures for preparing dehydrogenated rosin acids provide products having a rather wide variety of degrees of dehydrogenation. It will be understood in this connection that the resin acids present in wood and gum rosin are substantially entirely isomeric compounds possessing the empirical formula $$C_{20}H_{30}O_2$$

These isomers possess two ethylenic double bonds per molecule. Upon subjection to the known dehydrogenation processes a portion of the isomeric acids loses two atoms of hydrogen and it is believed that the resulting three ethylenic double bonds arrange themselves in the form of the most stable configuration, the benzene ring. Such acids have the empirical formula $C_{20}H_{28}O_2$ and are commonly referred to as "dehydroabietic acid." The dehydroabietic acid content of a dehydrogenated rosin acid may be ascertained by subjecting the same to ultraviolet absorption analysis. Obviously, the content of dehydroabietic acid of a dehydrogenated rosin acid is a measure of the degree of dehydrogenation of the original rosin acid.

As explained above, rosin acids having a variety of degrees of dehydrogenation result from the procedures for dehydrogenation described in the art. In general, any of the prior art dehydrogenated rosin acids may be employed in practicing this invention. It is preferred, however, to employ one having a dehydroabietic acid content of at least 40% and having an abietic-type resin acid content of not over 10%. It is still further preferred to employ a dehydrogenated rosin acid having a content of abietic-type resin acids of substantially 0.

Some reaction can be effected between a chemically stabilized rosin acid and acetylene at atmospheric pressure and pressure slightly thereabove. However, to achieve practical rates of reaction it is necessary to employ a pressure of at least 50 p. s. i. (gage). The preferred pressure to employ is one within the range of from about 100 to about 300 p. s. i. (gage). Still higher pressures may be employed if desired.

A temperature of at least 150° C. should be employed to achieve practical reaction rates. However, still lower temperatures are operable if the length of the reaction period and the extent of polymerization of the vinyl ester are of no concern. Thus, it must not be concluded that the figure 150° C. is a critical figure below which reaction is not obtained. The temperature employed should not be so high that substantial decomposition of the stabilized rosin acid takes place. It is preferred, taking into account the matters of practical reaction rate and safety, to employ a temperature within the range of from about 190° C. to about 250° C.

In connection with the use of superatmospheric pressure, it is pointed out that under certain conditions of temperature and pressure acetylene is explosive. No attempt is made herein to delineate the explosive ranges. However, when carrying out this invention under superatmospheric pressure, it is desirable, particularly during the first part of the reaction period, to dilute the acetylene with an inert gas such as nitrogen, hydrogen, carbon monoxide, methane, ethane, etc. It is also desirable to operate by remote control behind a substantial barricade.

In the specific examples hereof it is noted that undiluted acetylene was used even though the reactions were carried out at superatmospheric pressure. The fact that no detonations occurred is attributed to the use of well grounded equipment and a relatively small quantity of material. Other factors of importance were the use of small diameter pressure tubing and the absence of copper lines. It ordinarily takes a spark, copper acetylide or a sudden increase in pressure to detonate acetylene. In any event it is strongly recommended that in carrying out the examples the equipment be isolated by barricades and that it be operated by remote control.

As further illustrated by the examples, an inert solvent for the chemically stabilized rosin acid may be employed if desired. The employment of solvents is advantageous from the standpoint of ease of handling of the reaction mixture. There is also evidence of less polymerization of the vinyl esters when a solvent is employed. Any solvent for the chemically stabilized rosin acid which at the same time is inert to the acetylene under the conditions of reaction may be employed. Thus, aromatic hydrocarbons such as benzene, toluene, xylene, etc., aliphatic hydrocarbons such as hexane, heptane, isooctane, etc., and solvents such as tetrahydrofurane, dimethylformamide, etc. may be employed.

The catalyst employed, as stated previously, is a carboxylic acid salt of zinc, mercury or cadmium. With respect to the amount of the catalyst to employ, there should in general be employed sufficient of the salt such that it does exert a definite catalytic effect on the reaction with which this invention is concerned. In other words, it can be said that a catalytic amount of the salt should be used. No particular minimum amount can be set which will be generally applicable to all carboxylic acid salts of zinc, mercury or cadmium having a catalytic effect on the subject reaction, there being some variation in the applicable minimum in going from one salt to another. However, in order to achieve practical reaction rates, experience has shown that from about 0.02 to about 0.23 mol of the zinc, mercury or cadmium salt should be employed per mol of chemically stabilized rosin acid. Of course, molar ratios greater than 0.23 can be employed if desired. There appears to be no particular advantage, however, in going to these higher ratios. The preferred range of catalyst concentration is from about 0.03 mol to about 0.14 mol of the zinc, mercury or cadmium salt per mol of chemically stabilized rosin acid.

Distillation of these esters should be carried out in a leak-proof vacuum system. Pale colored esters distill over readily above 160 C. at 1 mm. pressure (absolute) until all of the volatiles have passed over. At this point further heating of the residue causes a sharp rise in temperature with attendant thermal decomposition and loss in vacuum.

The significant advantage of the process of this invention lies in the fact that the crude ester product resulting from the vinylation step is directly distillable. Heretofore, when rosin acid was used as the acid to be vinylated, it has been necessary to subject the crude ester product to a series of extractions with aqueous mineral acid and aqueous alkali to provide a distillable product. The subject process entirely avoids these intermediate extraction steps and provides a crude ester product which is directly distillable. Furthermore, substantially higher yields of distilled vinyl ester of chemically stabilized rosin acid are obtained in the subject process as compared with the prior art process in which rosin acid per se is employed. Using rosin acid per se without any chemical stabilization treatment prior to vinylation, the yields of distilled vinyl ester of rosin acid ultimately obtained are 60 to 65% based on the rosin acid, whereas using chemically stabilized rosin acids in accordance with this invention, the yields are normally 70% to 85% based on the chemically stabilized rosin acid.

The analytical method referred to supra for quantitatively completely hydrogenating a rosin acid is the following. This method effects removal of all unsaturation of the rosin acid existing due to the presence of carbon-carbon double bonds and aromatic nuclei.

The method consists of reducing a suspension of platinum oxide in acetic acid to platinum black in an atmosphere of hydrogen, adding a weighed sample of the rosin acid to the catalyst suspension and measuring the amount of hydrogen absorbed by the rosin acid.

The reagents employed are (1) acetic acid, empyreuma-free (passing dichromate test), (2) platinum oxide catalyst of the type described by Voorhees and Adams, J. A. C. S., 44, 1397 (1922), and by Adams and Shriner, J. A. C. S., 45, 2171 (1923), and (3) commercial hydrogen.

The apparatus employed includes a gas measuring buret, a reaction flask, and a magnetic stirrer. The gas buret employed is that described by C. R. Noller and M. R. Barusch, Industrial and Engineering Chemistry, Anal. Ed., vol. 14, 907 (1942), with the exceptions (1) there is a T and stopcock between the reaction flask (B) and the calibrated section of the buret (A) so that air may be removed and hydrogen admitted by alternate evacuation and filling and (2) there is a 25 ml. reservoir just below the calibrations of said section. The reaction flask employed is similar to that of Noller et al. except that in place of the side arm with cup it has a side arm fitted with a ground glass stopper. The stopper end (within the flask) is so made as to permit a sample cup placed thereon to drop to the bottom of the flask when the stopper handle is turned 90 degrees.

Remove the side arm of the reaction flask and weigh in 0.10 ± 0.01 g. PtO catalyst. Add a glass-encased iron wire and wash the catalyst into the flask with 5 ml. acetic acid. Grease the upper half of the ground joint on the side arm and insert in flask. Weigh the sample of rosin acid (0.15–0.20 g.) to the nearest 0.0001 g. into a 9 x 15 mm. sample cup. If the sample is a powdered solid, moisten with a drop of acetic acid. Place the sample cup in the neck of the flask where it is supported by the end of the stopper. Connect the flask to the gas buret using a thin film of grease on the ground glass joint, evacuate the apparatus and fill the same with hydrogen. Repeat the evacuation and filling cycle four times. The final filling with hydrogen should almost completely fill the reservoir at the base of the buret. When this condition is reached, the flow of hydrogen into the buret is stopped by closing the proper stopcocks.

A magnetic stirrer is placed below the reaction flask and started. The speed is regulated so that stirring is just sufficiently vigorous to break the liquid surface. At this point reduction of the catalyst starts. When the catalyst is completely reduced to platinum black as evidenced by no further change in the mercury level (this requires about 1 hour), the mercury surfaces in the buret are leveled using the mercury reservoir. This condition of complete reduction is determined by reading the leveled mercury volume at 30-minute intervals until the volume is constant within 0.1 ml.

When complete reduction of the PtO has been achieved, record the gas volume, temperature, and barometric pressure. The gas volume at this point should not be more than 45 ml. Rotate the side arm so as to allow the sample cup to drop into the acetic acid solution. Permit hydrogenation to proceed for about 16 hours. Read the final gas volume, temperature, and pressure. Temperature is read to the nearest 0.1° C. and the pressure to the nearest 1 mm. Correct the initial and final gas volumes to standard conditions, first adding the volume of the uncalibrated system.

$$\frac{(\text{Corrected initial volume} - \text{corrected final volume})\ 0.00900}{\text{grams of sample}} = \text{percent } H_2 \text{ absorbed}$$

This application is a continuation-in-part of application Serial No. 126,234 filed November 8, 1949.

The vinyl esters of chemically stabilized rosin acids and polymers of said vinyl esters, disclosed herein, are claimed in application Serial No. 185,324, filed September 16, 1950, by John C. Robinson, Jr., and Walter S. Ropp.

What I claim and desire to protect by Letters Patent is:

1. A process for preparing a vinyl ester of a stabilized rosin acid which comprises vinylating a stabilized rosin acid by contacting the same in liquid phase with acetylene under superatmospheric pressure in the presence of a catalyst selected from the group consisting of the carboxylic acid salts of zinc, mercury and cadmium and separating the resulting vinyl ester of the stabilized rosin acid from the other ingredients of the reaction mixture by distillation, the relatively crude ester product being directly distillable.

2. A process for preparing a vinyl ester of a stabilized rosin acid which comprises stabilizing a rosin acid by subjecting the said rosin acid to hydrogenation, then vinylating the stabilized rosin acid by contacting the same in liquid phase with acetylene under superatmospheric pressure in the presence of a catalyst selected from the group consisting of carboxylic acid salts of zinc, mercury and cadmium and separating the resulting vinyl ester of the stabilized rosin acid from the other ingredients of the reaction mixture by distillation.

3. A process for preparing a vinyl ester of a stabilized rosin acid which comprises stabilizing a rosin acid by subjecting the said rosin acid to hydrogenation, then vinylating the stabilized rosin acid by contacting the same in liquid phase with acetylene under superatmospheric pressure in the presence of a carboxylic acid salt of zinc as catalyst and separating the resulting vinyl ester of the stabilized rosin acid from the other ingredients of the reaction mixture by distillation.

4. A process for preparing a vinyl ester of a stabilized rosin acid which comprises stabilizing a rosin acid by subjecting the said rosin acid to dehydrogenation, then vinylating the stabilized rosin acid by contacting the same in liquid phase with acetylene under superatmospheric pressure in the presence of a catalyst selected from the group consisting of carboxylic acid salts of zinc, mercury and cadmium and separating the resulting vinyl ester of the stabilized rosin acid from the other ingredients of the reaction mixture by distillation.

5. A process for preparing a vinyl ester of a stabilized rosin acid which comprises stabilizing a rosin acid by subjecting the said rosin acid to dehydrogenation, then vinylating the stabilized rosin acid by contacting the same in liquid phase with acetylene under superatmospheric pressure in the presence of a carboxylic acid salt of zinc as catalyst and separating the resulting vinyl ester of the stabilized rosin acid from the other ingredients of the reaction mixture by distillation.

6. A process for preparing a vinyl ester of a stabilized rosin acid which comprises stabilizing a rosin acid by subjecting the said rosin acid to hydrogenation until a hydroyenated rosin acid which is at least 40% saturated with hydrogen and which has a content of abietic-type resin acids of not over 10% is produced, then vinylating the stabilized rosin acid by contacting the same in liquid phase with acetylene under superatmospheric pressure in the presence of a catalyst selected from the group consisting of carboxylic acid salts of zinc, mercury and cadmium and separating the resulting vinyl ester of the stabilized rosin acid from the other ingredients of the reaction mixture by distillation.

7. A process for preparing a vinyl ester of a stabilized rosin acid which comprises stabilizing a rosin acid by subjecting the said rosin acid to dehydrogenation until a dehydrogenated rosin acid having a dehydroabietic acid content of at least 40% and having an abietic-type resin acid content of not over 10% is produced, then vinylating the stabilized rosin acid by contacting the same in liquid phase with acetylene under superatmospheric pressure in the presence of a catalyst selected from the group consisting of carboxylic acid salts of zinc, mercury and cadmium and separating the resulting vinyl ester of the stabilized rosin acid from the other ingredients of the reaction mixture by distillation.

JOHN C. ROBINSON, Jr.

REFERENCES CITED

The following references are of record in the file of this patent:

UNITED STATES PATENTS

| Number | Name | Date |
|---|---|---|
| 2,066,075 | Reppe | Dec. 29, 1936 |
| 2,472,084 | Beller et al. | June 7, 1949 |